United States Patent [19]

Buck

[11] Patent Number: 6,089,242

[45] Date of Patent: Jul. 18, 2000

[54] DAIRY HARVESTING FACILITY WASH SYSTEM

[75] Inventor: Robert L. Buck, Holmen, Wis.

[73] Assignee: Babson Bros. Co., Naperville, Ill.

[21] Appl. No.: 09/021,632

[22] Filed: Feb. 10, 1998

[51] Int. Cl.[7] ....................................................... B08B 9/00
[52] U.S. Cl. ................. 134/57 R; 134/58 R; 134/115 R; 134/169 C; 134/166 C; 134/100.1; 119/14.18
[58] Field of Search ................................ 134/58 R, 57 R, 134/105, 115 R, 95.1, 100.1, 169 C, 166 C; 119/14.18

[56] References Cited

U.S. PATENT DOCUMENTS

| | | |
|---|---|---|
| Re. 31,659 | 9/1984 | Brown . |
| 3,116,743 | 1/1964 | Sparr . |
| 3,119,400 | 1/1964 | Bihler . |
| 3,160,317 | 12/1964 | Hambro . |
| 3,336,767 | 8/1967 | MacKenzie et al. ................. 68/17 R |
| 3,804,297 | 4/1974 | Jarjans ................................. 68/17 R |
| 4,011,838 | 3/1977 | Nordegren et al. . |
| 4,034,713 | 7/1977 | Umbaugh . |
| 4,175,514 | 11/1979 | Souza et al. . |
| 4,208,219 | 6/1980 | Etscheid . |
| 4,222,346 | 9/1980 | Reisgies . |
| 4,452,268 | 6/1984 | Icking et al. . |
| 4,462,425 | 7/1984 | Mehus . |
| 4,476,808 | 10/1984 | Meermoller et al. . |
| 4,516,530 | 5/1985 | Reisgies et al. . |
| 4,516,592 | 5/1985 | Schultz et al. . |
| 4,606,297 | 8/1986 | Bücker . |
| 4,702,197 | 10/1987 | Icking et al. . |
| 5,080,040 | 1/1992 | van der Lely et al. . |
| 5,195,456 | 3/1993 | van der Lely et al. . |
| 5,272,997 | 12/1993 | van der Lely et al. . |
| 5,275,184 | 1/1994 | Nishizawa et al. .................... 134/57 R |
| 5,282,889 | 2/1994 | Franklin ................................. 134/57 R |
| 5,313,833 | 5/1994 | Hoefelmayr . |
| 5,379,721 | 1/1995 | Dessing et al. . |
| 5,390,627 | 2/1995 | van der Berg et al. . |
| 5,405,452 | 4/1995 | Anderson et al. . |
| 5,427,126 | 6/1995 | Carney et al. . |
| 5,722,441 | 3/1998 | Termoto . |
| 5,896,828 | 4/1999 | Kronschnabel et al. . |

FOREIGN PATENT DOCUMENTS

| | | |
|---|---|---|
| 0 761 091 A1 | 3/1997 | European Pat. Off. . |
| 0 772 971 A3 | 5/1997 | European Pat. Off. . |
| 0 772 971 A3 | 7/1997 | European Pat. Off. . |

OTHER PUBLICATIONS

"Germania AccuWeigh ReceiveAll™ receives patent", Progressive Dairyman, Oct. 1999, 1 pg., vol. 13, No. 10, Northwest Addition.

European Patent Office, Notification Of Transmittal Of The International Search Report Or The Declaration, 7 pp.

Form PCT/IPEA/408, PCT written Opinion received Jan. 24, 2000, 4pgs.

Primary Examiner—Frankie L. Stinson
Attorney, Agent, or Firm—Lathrop & Clark LLP

[57] ABSTRACT

A dairy pipeline wash system for monitoring and controlling the wash cycle of a dairy harvesting facility including a user interactive data processor for receiving and storing wash parameters, monitoring wash conditions, comparing monitored wash conditions to wash parameters, and controlling wash conditions to comply with wash parameters. The dairy pipeline wash system may include a closed loop or fuzzy logic system to vary wash conditions as dairy pipeline conditions change.

34 Claims, 4 Drawing Sheets

DAIRY HARVESTING FACILITY WASH SYSTEM

FIELD OF THE INVENTION

The present invention relates to dairy wash systems and more particularly a dairy wash monitoring and control system.

BACKGROUND OF THE INVENTION

In a dairy harvesting facility, raw milk from cows is pumped through various milk conduits, chillers, valves, and milk quality monitoring equipment to a bulk tank for storage. Because raw milk contains various microorganisms that have the potential to contaminate the milk conduits if those conduits are left untreated for a period of time, it is necessary to clean the milk conduits on a regular basis. It is also necessary to clean the bulk tank after a batch of stored raw milk is removed, at a time prior to that when a new batch of raw milk enters the bulk tank. Therefore, dairy harvesting facilities have washing systems for cleaning the milk conduits and bulk tanks between milkings.

A typical dairy washing system uses various liquid chemicals, such as detergents, acids, and sanitizers, along with water, to clean the milk conduits and bulk tanks. The liquid chemicals are usually dispensed in the sequence detergent/acid/sanitizer each mixed with a volume of water and circulated throughout the system.

The liquid chemicals are dispensed via a chemical dispenser connected to a separate source tank for each chemical to be used. Each chemical is pumped by a separate pump through an input conduit into the chemical dispenser, and exits the dispenser and travels to the utilization point via an output conduit. Separate pumps and conduits are used for each chemical, to avoid unwanted reactions between chemicals during the dispensing process.

It is extremely important that the proper amount of each chemical be supplied to the utilization point for cleaning the milk conduits. If the conduits and/or bulk tank are improperly cleaned, milk passing through the conduits or into the bulk tank can become contaminated, either by microorganisms or excess chemicals in the conduits and/or bulk tank. This contaminated milk must be discarded, at considerable cost to the dairyman.

Further, the milk conduits, valves, chillers, chemical dispensers, and bulk tank are typically in remote locations from one another and from the dairy parlor where the cows are actually milked. Ensuring that the valves, pipes, chiller, and bulk tank are in appropriate positions prior to the wash cycle and then again after the wash cycle and prior to the milk cycle requires the dairy operator to walk from one location to another in the dairy each time a wash cycle is done.

Systems have been developed to attempt to ensure that the proper amount of chemicals are used. One such system has a visual flow meter coupled to the output conduit for each chemical. Although this system allows an operator to visually verify that a liquid chemical is flowing to the utilization point, it does not allow the operator to determine whether the chemical is flowing at the proper rate. Moreover, chemical dispensers having visual flow meters are often not monitored by an operator, because the chemical dispenser, to avoid undue pressure drops, is typically located in close proximity to the chemical source tanks. These tanks, in turn, are typically located at some distance from the milking parlor, making it difficult for the operator to monitor a visual indicator such as a visual flow meter or clear section of pipe. Further, the prior systems for monitoring chemical dispensing had no means for monitoring or controlling valve position, chiller temperature, wash water temperature, bulk tank condition, milk circulation pumps, and vacuum pump operation before, during, and after a wash cycle.

In an attempt to remedy these problems, an electronic flow sensor was coupled to the output conduit for each chemical. The electronic flow sensor, which was a rotometer that generated a signal for each full rotation, is electrically connected to a programmable logic controller ("PLC"). The PLC is programmed to count a specific number of signals from the flow sensor, and when that number was reached, to turn off the pump. With that type of system, a specific number of signals must be received in a relatively long predetermined period of time and only at the end of that time will a problem be detected.

This system, while an improvement over a dairy chemical dispensing system having a visual flow sensor, still has several problems. First, since the PLC only looks for a specified number of signals, the operator cannot determine if there is a problem with the chemical dispenser, such as fouled conduits, that is slowing down the chemical flow. Second, since the alarm is only activated if the PLC does not receive the requisite number of signals in a period of time substantially longer than the normal dispensing of the chemical should take, problems that require urgent attention, such as a leak or a disconnected conduit, are not immediately detected. Finally, if the operator wants to change the number of signals counted by the PLC or the time period over which those signals are counted, he must program those changes directly into the PLC at the PLC location. This is inconvenient.

What is needed is a dairy chemical dispensing system that repeatedly monitors the actual chemical flow rate over the entire time the chemical is supposedly being dispensed, so small variations in flow rate that may indicate impending problems or the need for maintenance, as well as major problems such as leaks and disconnected conduit, can be quickly discovered and acted upon. What is also needed is a dairy chemical dispensing system than can be monitored at a location remote from the chemical dispenser itself, which also allows the operator to easily and quickly adjust the specific amount of chemical to be dispensed. Also needed is a dairy wash system that monitors and controls all aspects of the milk conduit wash system such as: wash water and chemical temperatures and velocity, wash slug size, pipe positioning, vacuum pump operation, chiller temperature, bulk storage tank status and others to alert an operator and avoid potential errors that can occur in manual checking of all mechanical features of the dairy wash system.

These needs are met by the dairy wash monitoring and control system of the present invention.

SUMMARY OF THE INVENTION

In accordance with the present invention, there is provided a dairy pipeline wash system having: a first chemical supply tank, a first pump, and a first flow meter; a second chemical supply tank, a second pump, and a second flow meter; a mixer vessel in fluid communication with the first and second chemical supply tanks; a water supply in fluid communication with the mixer vessel; a milk harvesting pipeline system in communication with an output of the mixer vessel for receiving chemicals from the first chemical supply tank and the second chemical supply tank; and a data processor for receiving input parameters and generating signals to activate any pump or combination of pumps to supply a predetermined amount of chemical to clean the milk harvesting pipeline system. The system may include additional chemical wash supply tanks, pumps; and flow meters. There may also be a wash vessel in fluid communication between the mixer and the milk harvesting pipeline, a temperature monitored milk chiller, an air injector for enhancing the wash cycle speed and thoroughness, and valve and pipe position indicators, and related controllers.

Another dairy pipeline wash monitoring system in accordance with the present invention may include: a dairy pipeline system for conveying milk from a milking machine to a bulk storage tank; a plurality of sensors for monitoring wash conditions a data processor for receiving signals from the monitors and comprising the signals to wash parameters input at the operator interface. The data processor may control chemical pump operation and the monitors may monitor a valve having a first position for controlling the flow of milk from the milking machine to the bulk storage tank during a milking cycle and a second position for controlling the flow of cleaning chemicals through the dairy pipeline system during a wash cycle; and the sensors may be positioned at a predetermined location in the dairy pipeline wash system to determine actual flow rates at a respective location. The data processor preferably stores valve position parameters for the milking cycle and the wash cycle, pump operation sequencing information for the wash cycle, and pump operation time for delivering a predetermined quantity of cleaning chemicals to the dairy pipeline system for each pump; and preferably activates the valves to move from the first position to the second position in preparation of the wash cycle. The data processor is also generating a warning signal when actual flow rates are out of an acceptable range relative to the wash parameters.

This dairy pipeline wash monitoring system may further include: a valve position indicator for generating a signal corresponding to the first position and the second position of each valve; and the data processor is programmed to receive the signal from the valve position indicator, override the activation of pumps, and prevent initiation of the cleaning cycle in the event any single valve remains in the first position after activating the valves to move from the first position to the second position in preparation of the wash cycle. Further, in this dairy pipeline wash monitoring system the data processor can be programmed to generate a warning signal when any valve remains in the first position after being activated to move to the second position.

Alternatively, the dairy pipeline wash monitoring system data processor can be programmed to: circulate water and an optional cleaning chemical through the dairy pipeline system; activate an air injector to enhance water and optional cleaning chemical velocity through the dairy pipeline system; drain the water and optional cleaning chemical from the dairy pipeline system; activate a second pump or valve to fill the wash vessel with water and optional cleaning chemical and inject the wash chemical into the wash vessel or a manifold and circulate the wash chemical and water through the dairy pipeline system; activate an air injector to enhance water and wash chemical velocity through the dairy pipeline system; drain the wash chemical and water from the dairy pipeline system; fill the wash vessel with water; optionally inject a rinse chemical into the wash vessel or manifold to mix with the water and circulate the rinse chemical and water through the dairy pipeline system, activate an air injector to enhance water and rinse chemical velocity through the dairy pipeline system, and drain the rinse chemical and water from the dairy pipeline system.

Further, the data processor can be programmed to: fill the wash vessel with water; inject a chemical detergent into the wash vessel or manifold to mix with the water and circulate the cleaning chemical and water through the dairy pipeline system; activate an air injector to enhance water and cleaning chemical velocity through the dairy pipeline system; and drain the cleaning chemical and water from the dairy pipeline system. The dairy pipeline wash system may further include: a thermocouple in thermal communication with the wash water for generating a signal corresponding to the temperature of water to be received by the data processor; and the data processor is further programmed to compare the signal from the thermo-couple to an acceptable predetermined temperature range and generate a warning signal when the wash water temperature is outside of the acceptable predetermined temperature range. Another embodiment of a dairy pipeline wash monitoring system may include: a plurality of thermo-couples each in thermal communication with a predetermined location in the dairy pipeline system for generating a signal corresponding to the temperature of water at that respective location to be received by the data processor; and the data processor is further programmed to compare the signal of each thermo-couple to a predetermined acceptable temperature range and generate a warning signal if the temperature at any thermo-couple location is out of the acceptable temperature range.

The flow sensors can each include: a flow meter in fluid flow communication with each pump, the flow meter for generating a signal corresponding to the actual flow rate of fluid through the flow meter; and the data processor can be further programmed to compare the signal from each flow meter to a predetermined acceptable flow range and generate a warning signal if the flow at the location of the flow meter is out of the acceptable flow range. With this arrangement the data processor is further programmed to deactivate a pump in response to a warning signal, which can be an audible alarm, in the event the flow at the location of the flow meter is out of the acceptable flow range.

A method for monitoring dairy pipeline wash systems in accordance with the present invention can include the steps of receiving dairy wash parameters in a data processor from an operator interface; activating wash chemical pumps to dispense wash chemicals in a sequence responsive to the wash parameters; mixing the wash chemicals with water at a predetermined temperature; and circulating the wash chemicals and water through the dairy harvesting facility pipeline. The method may further include the steps of: monitoring the temperature of wash chemicals and water at predetermined locations in the dairy harvesting facility pipeline; and adjusting the temperature of water being mixed with wash chemicals to maintain the temperature of wash chemicals and water at the predetermined locations in the dairy harvesting facility pipeline.

Alternatively, the method may further include the steps of: monitoring the positions of valves in the dairy harvesting facility pipeline; and resetting valve positions prior to initiating a pipeline wash cycle or resetting valve positions prior to initiating a milk cycle or both. The method may include the step of shutting down a milk chiller prior to initiating a dairy pipeline wash cycle; monitoring and adjusting wash water pH monitoring wash liquid slug size and velocity, monitoring pipe proximately, monitoring bulk tank conditions, and others relating to a dairy wash cycle. The method preferably includes the step of applying a closed loop data processing system to adjust wash system parameters in response to data received from sensors in the dairy harvesting facility. A wash liquid slug is a leading edge of an entrapped volume of air injected into the system.

Therefore, it is an object of the present invention to provide a dairy wash monitoring system that can be monitored from a location that is remote from the individual wash system components.

It is a further object of the present invention provide information to the operator regarding small variations in wash chemical flow rate; wash water temperature, pH, slug size and velocity; valve and pipe position during the wash and milking cycles; chiller operation status and temperatures; and bulk tank status, thus allowing the operator to identify any system problems before significant milk loss results or improper system cleaning disrupts dairy operations, and to identify when maintenance or replacement of parts may be necessary.

It is yet an additional object of the present invention to provide a dairy wash system that allows for quick operator response to problems, such as, for example, improperly set valves and chillers, leaks, spills, and/or disconnected conduits.

It is another object of the present invention to provide a dairy wash monitoring system that ensures the proper wash chemical quantities are dispensed.

Further objects, features and advantages of the present invention will be apparent from the following detailed description when taken in conjunction with the accompanying drawing.

DESCRIPTION OF THE PREFERRED EMBODIMENT

Figure 1:
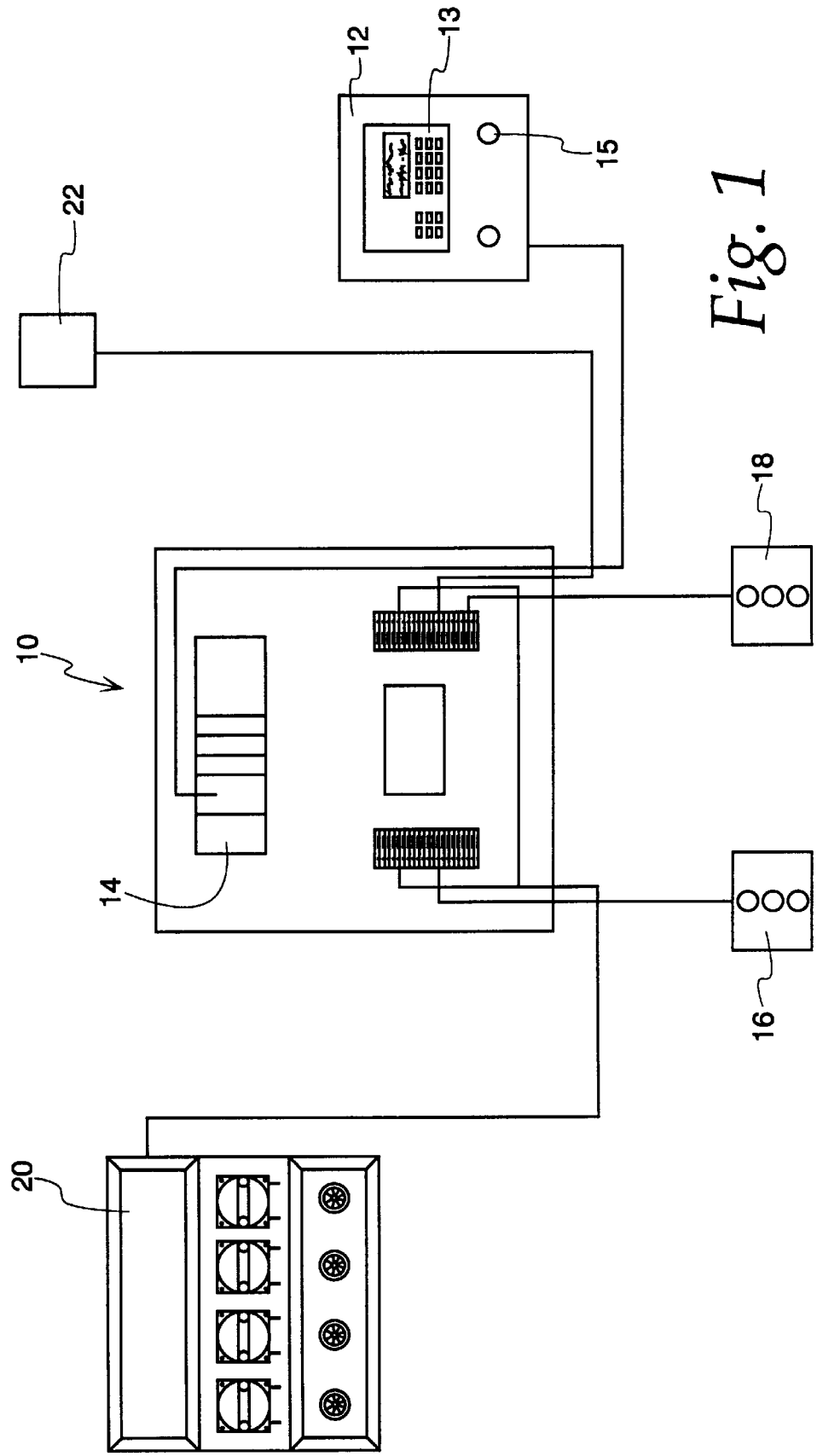
FIG. 1 is a schematic view of a logic controller layout in accordance with the present invention.

Referring to FIG. 1, a dairy wash logic controller 10 in accordance with the present invention is shown schematically. The controller 10 generally comprises an operator interface 12 in a data receiving and transmitting relationship with a printed circuit board microprocess programmable logic controller or generally a data processor 14 having input terminals 16 and output terminals 18 such as relays, transistors, traics, and switches in general. A chemical dispenser 20 is also illustrated in a data receiving and transmission relationship with the data processor 14. Although the operator interface 12 can be located in close proximity to the data processor and other system components, it is preferred that the operator interface 12 be located for convenient access by an operator, including at locations throughout the dairy harvesting facility. The operator interface 12 has a membrane switch 12 or push buttons 15 allows the operator to input, monitor, and adjust various parameters relating to the dairy wash system including, but not limited to, the type of chemical or chemicals to be used, and the amount of each chemical to be dispensed per cleaning cycle, the temperature of the wash chemicals and water, the temperature and operating cycles of a chiller, the position of the valves during the wash and milk cycles, and the bulk tank fill level and mixer operation (described in detail below). The controller 10 also preferably includes an alarm 22 that can be audible, visible, or both to notify the operator of problems and/or maintenance needs relating to the dispensing and wash system. More preferably, the controller 10 uses the alarm signal to generate output that adjusts the wash system to maintain wash parameters.

As stated above, the controller 10 is in a data-receiving and -transmitting relationship with a chemical dispenser 20. The chemical dispenser 20 is capable of dispensing two or more separate liquid chemicals, which are typically a detergent, an acid, and a sanitizer. In addition, the chemical dispenser 20 can be configured to dispense any number of chemicals or combinations of chemicals desired by the operator. Normally, at least two chemicals are used during the wash cycle, but any number can be incorporated into the chemical dispenser 20. A preferred chemical dispenser is the ProFORM™ Chemical Dispenser available from Babson Bros., Inc. of Naperville, Ill.

For each chemical to be dispensed, a storage tank 30 (FIG. 2), which may be located in an area of the dairy harvesting facility different from the location of the chemical dispenser 20, is connected to a chemical source conduit 32. A pump 34 dispenses the chemical from the storage tank 30 through the chemical source conduit 32 and an output conduit 36. The pump 34 may be any type capable of being used or actually used in dairy chemical dispensing operations, and may be either a variable speed or constant speed pump. Typically, pumps used in dairy chemical dispensers are 9 oz/min or 40 oz/min displacement pumps. Preferably, the pump 34 in the system of the present invention is a peristaltic pump, such as those manufactured by Knight Equipment Corp. of Costa Mesa, Calif. are available in numerous pump capacities all operated at a single voltage and having identical bolt patterns to make them interchangeable in a single control panel. Such pumps are available having displacement rates between 9 oz. to 226 oz.

A flow sensor 40 is connected to each output conduit 36 for monitoring the actual flow rate of the chemical being dispensed. The flow sensor 40 must be capable of electronically communicating the actual flow rate with a data processor 14 such as a high speed counter rotometer, or non-contacting sensors such as optical sensors, ultrasonic sensor, thermal sensor, etc. Preferably, the flow sensor 40 is an electronic rotometer having a magnet on one or more of the rotometer blades that is sensed by a Hall effect switch on the rotometer housing. In this manner, the Hall effect switch allows an electrical signal to pass through when the rotor magnet comes in close proximity. Rotometers of this type are available from Gem™ Sensors of Plainville, Conn., under part no. 159496 and preferably including a PPS composite rotor for chemical exposure.

Figure 2:
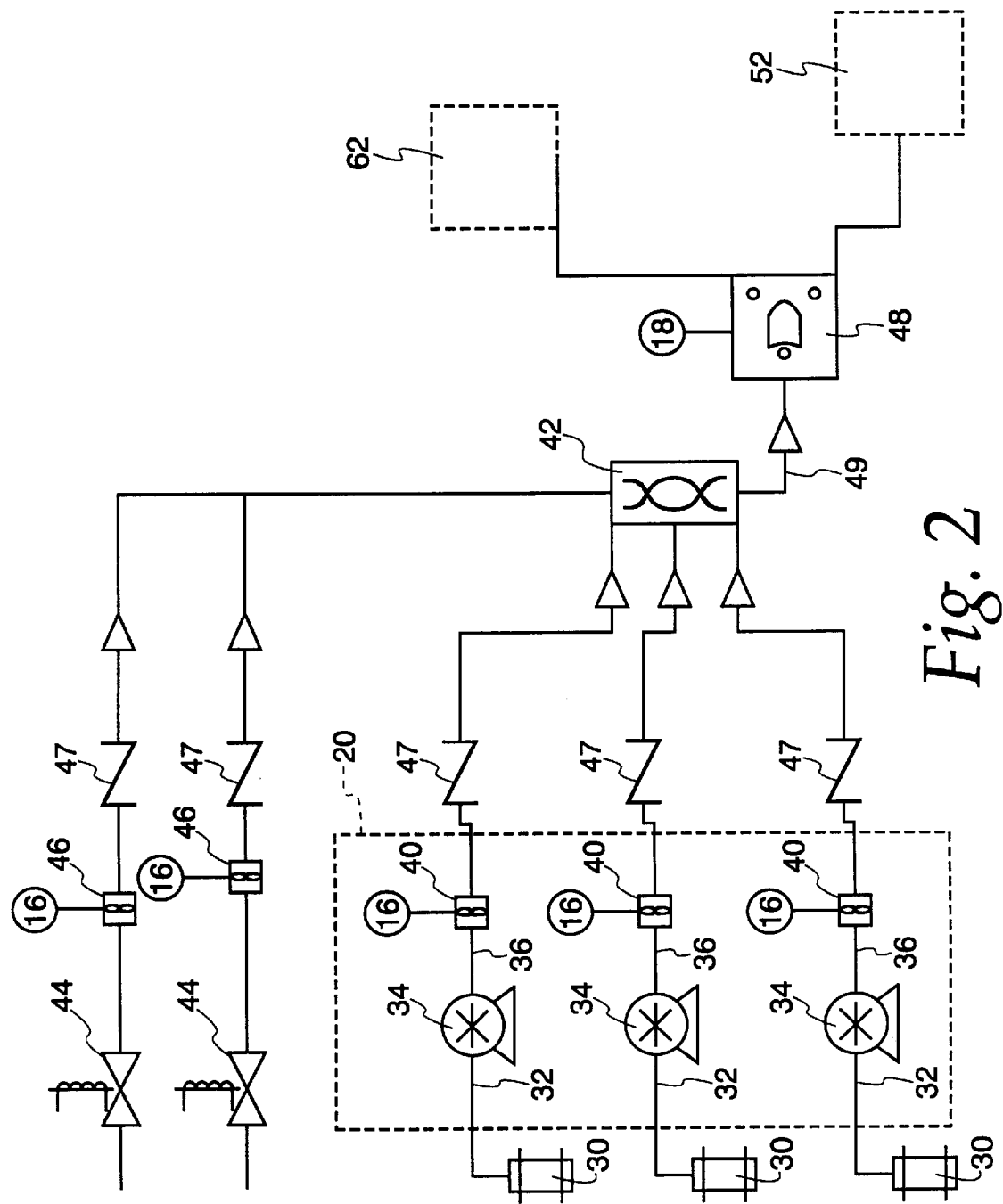
FIG. 2 is a schematic diagram of a chemical dispenser and water fill pipeline in accordance with the present invention.

The data processor 14 can be used to receive input from flow sensors 40 positioned along a chemical conduit system as shown in FIG. 2. The operation of the pumps 34 is initiated by the data processor 14 output 18 and actual flow rates through the outlet conduits 36 are measured by the flow senors 40 and transmitted back to the data processor 14 input 16. In this manner, the data processor 14 monitors the chemical dispenser output and generates a warning signal that can be translated to an audile alarm 22, for example, or be used to vary pump 34 operation times when flow rates are slow due to partial line blockage, for example.

The data processor 14 inputs 16 monitor and the outputs 18 control other wash cycle parameters such as water temperature as it is fed to a mix vessel 42 or manifold referred to generically by numerically 42. The temperature of the water is monitored with thermo-couples and compared to the wash temperature parameters. The water temperature can be controlled by the addition of hot or cold water through the operation of valves 44 such as solenoid valves. The flow rate from these valves 44 can be monitored by water flow meters 46. Check valves 47 along the chemical mixer prevent reverse flow. From the mix vessel or manifold 42, the chemical and water mixture is pumped to a manifold conduit 49, an optional wash system manifold 48 that directs wash mixture to a clean-in-place line 62 (either directly or indirectly through a sanitary storage vessel 50) and/or a bulk milk storage tank 52 for claiming cleaning depending on output is from the data processor 14 or other device such as a valve.

Figure 3:
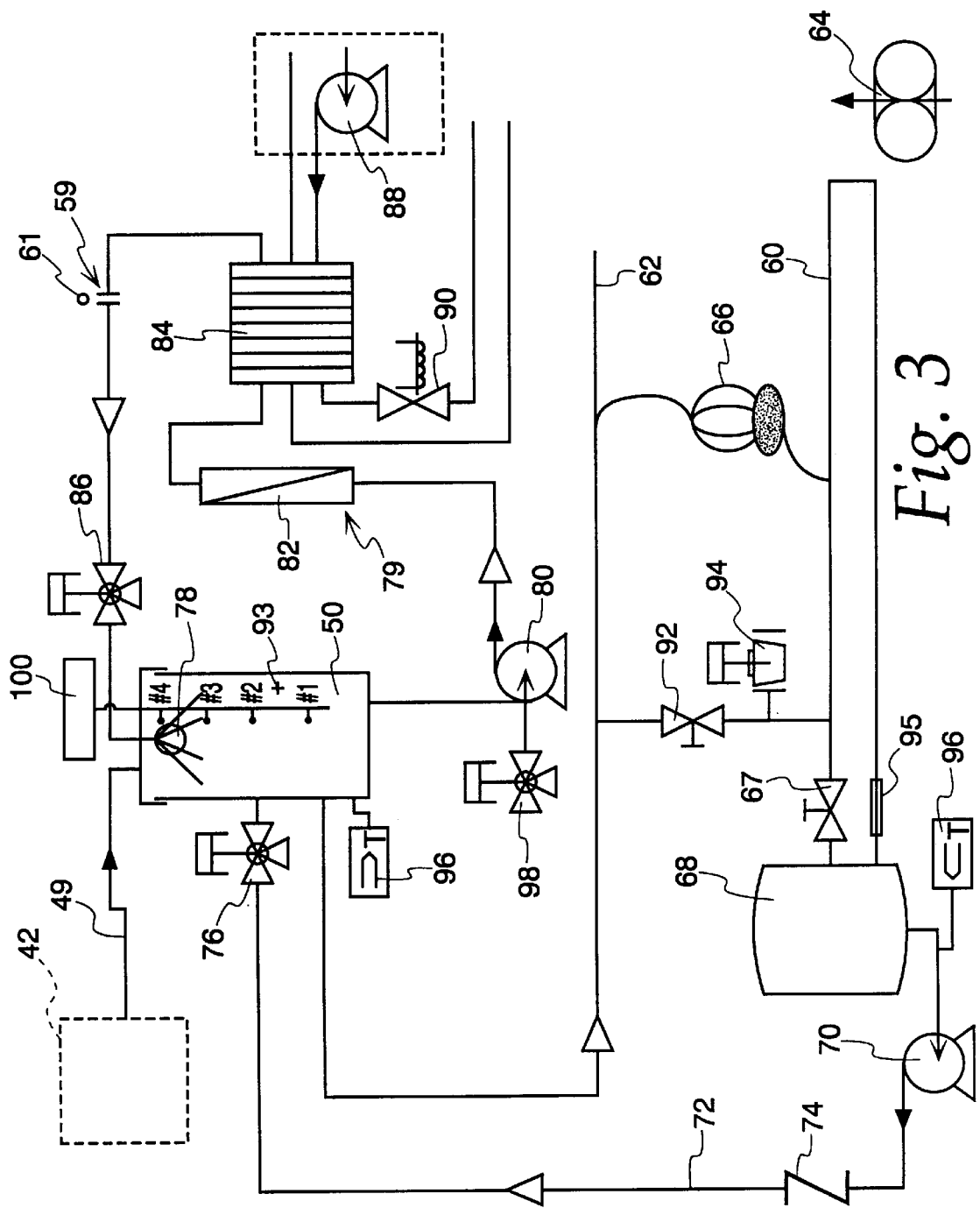
FIG. 3 is a schematic diagram of a milk line conduit and clean-in-place wash line in accordance with the present invention.

Illustrated in FIG. 3, are schematic representations of a dairy harvesting milk line 60 and a clean-in-place line 62 that receives cleaning liquid from the mix vessel or manifold 42 The milk line 60 operates during a milk cycle using a vacuum pump 64 to apply a vacuum to a milker unit 66 and send the milk to a receiving tank 68. From the receiving tank 68, raw milk is transmitted through a milk pump 70 through conduit 72 and check valve and 74, through a diverter 76 and to a sanitary storage vessel 50 with a spray ball 78. From the sanitary storage vessel 50, milk can be processed through a variable speed pump 80, a filter 82, a plate cooler 84, through a second diverter 86, and the spray ball 78 for mixing the milk and storing it in the sanitary storage vessel 50. The chiller 79 may include a chiller pump 88 and plate cooler water valve 90 that controls the plate cooler heat exchanger operation.

The clean-in-place line 62 interfaces with the milk line 60 in a number of places, including, the sanitary storage vessel 50, the milker unit 66, and an add-a-water line 92 that adds water to aid in cleaning milk line 60 and adds liquid volume to help define a cleaning slug.

It may be necessary to connect a pipe 59 using any appropriate releasable clamp. When this is necessary, a pipe proximity sensor 61 can be used in a data transmitting and receiving relationship with the data processor 14 to signal pipe position so that a warning signal can be generated, if necessary. Such a connectable pipe and sensor combination can appear in numerous locations in such a system.

Any conduit, valves, vessel, diverter, filter or cooler that receives milk must be cleaned periodically, and thus, must include communication with the clean-in-place line 62 to receive water and wash chemical. The wash cycle can be further enhanced by using an air injector 94 to increase wash chemical and water velocity and agitation, and thereby the thoroughness of the wash cycle. Preferably, it is desirable to monitor temperature at number of locations in the system including a discharge point of the receiving tank 68, sanitary storage vessel 50, and any other desired location using thermo-couples 96. Finally, wash water and chemicals are flushed from the system at any desired location including a vat drain 98 at the bottom of the sanitary storage vessel 50.

System wash liquid temperature is important and can be affected by the operation of the plate cooler 84 during the wash cycle. Obviously, operation of the plate cooler 84 during a wash cycle will have a detrimental affect on the wash cycle as a whole. Thus, the plate cooler 84 cooling fluid flows should be turned off manually or by remote control.

In accordance with the present invention, the temperature of the chiller plate cooler 84 can be monitored to determine whether it is off and warmed to ambient or close to ambient temperature prior to initiating the wash cycle. Preferably, the plate cooler 84 cooling fluid flows will be shut down in advance of the wash cycle by output from the data processor 40.

After the data processor 14 initiates the wash cycle with flow of chemicals and water, it is necessary to reorient all of the valves and pipes in the milk handling conduit line 60 and to reapply a vacuum to the milk line. Typically, reorienting valves is done by hand by an operator moving through the dairy harvesting facility. The data processor 14 can monitor all valve positions throughout the dairy harvesting facility and signal the dairy operator at a remote location in the event any valves are oriented in an incorrect position. When valves are not oriented properly, significant loss of milk can result because wash liquids can contaminate milk if valves are not in their proper positions. Similarly, at the end of a wash cycle, the valves must be returned to their original positions prior to beginning another milk cycle. Again, reorienting the valves is typically done manually, and the present invention utilizing the data processor 14 for monitoring valve position signals a dairy operator that all valves are in their designated positions. If valves are not returned to their designated positions prior to initiation of a milk cycle, milk will be pumped through the conduits and possibly be dumped through the vat drain 98. Preferably, the valves are pneumatic valves that can be moved between open and closed positions remotely by the data processor output 18.

Figure 4:
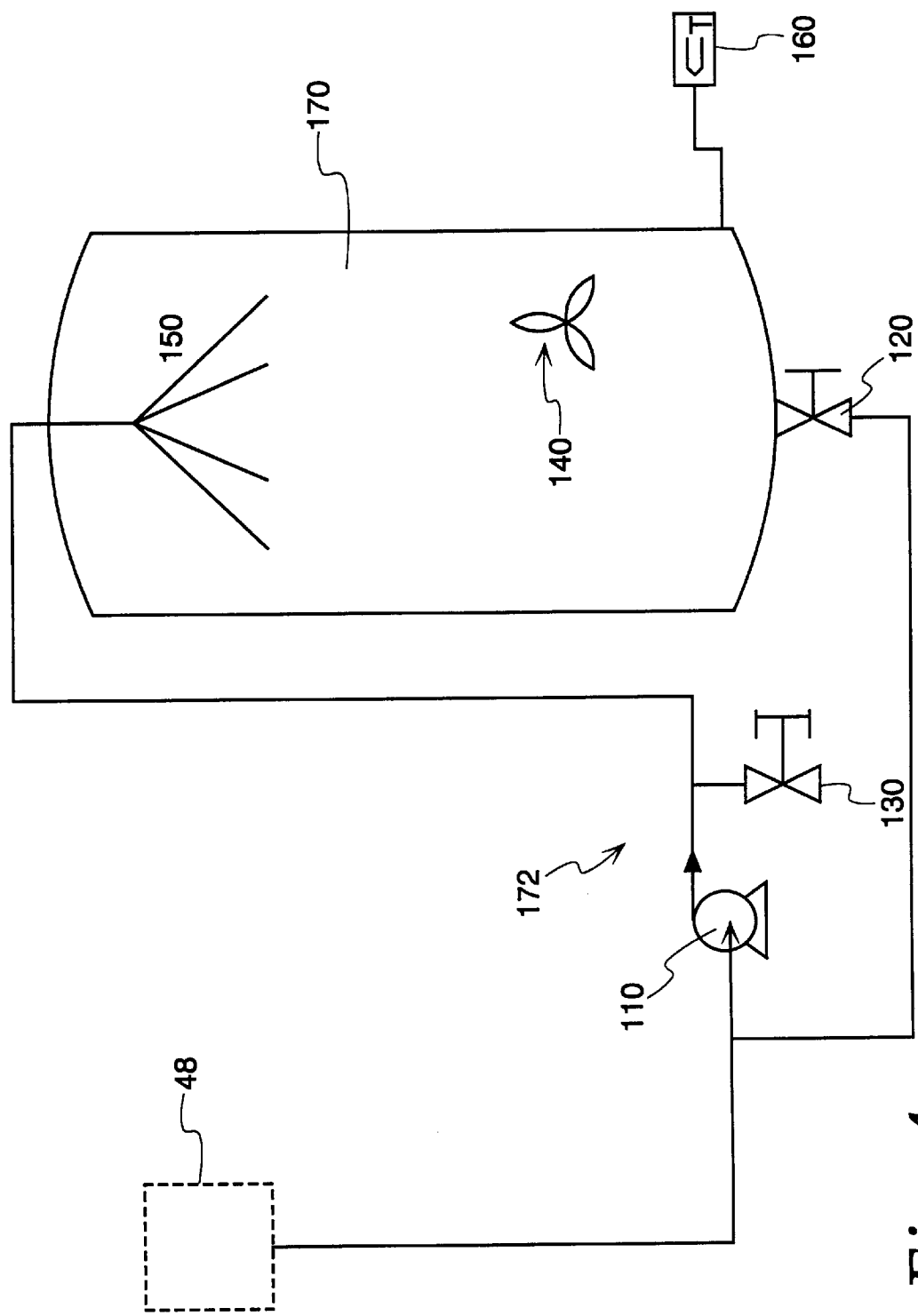
FIG. 4 is a schematic diagram of a milk bulk storage tank in accordance with the present invention.

As with the milk pipeline 60, the above system configuration can also be used to clean bulk milk storage tanks 170 (FIG. 4) utilizing the same controller 10 and chemical dispenser 20. In cleaning bulk tanks 170, the wash solutions are diverted to the bulk tank clean-in-place system 172 through manifold 48 (FIG. 2). A different "recipe" of wash chemicals and water are typically used. If valves are not turned to the correct position, the operator will be notified and bulk tank wash will be prevented until the system 172 had been correctly configured for wash. The data processor sequences valves 120 and 130, chemical pumps, circulation pump(s) 110, a spray ball 150, and an agitator motor 140 to wash the bulk tank 170. The typical bulk tank clean-in-place system utilizes a transfer pump 110 that pumps water and chemical solution to an upper spray device 150 that distributes the solution to the inner tank walls. The agitator 140 turns during wash to facilitate better cleaning. After adequate cleaning time has elapsed, the drain valve 130 (FIG. 4) opens Temperature of the bulk tank can be monitored by the controller with a thermo-couple 160 to assure that a high enough wash temperature is attained.

Additional wash system parameters can be monitored and controlled using the present invention. For example, wash water pH wash liquid velocity, and wash liquid slug size can all be monitored and corresponding signals sent to the data processor 14. Wash water pH can be monitored using a pH sensor 93, and a wash liquid velocity and slug size can be measured at 95 optically, ultrasonically, or using other means. Any warning signal generated as a result of these parameters being out of range can be used to generate sound or alarm or be used to alter wash parameters (such as wash liquid volume, speed, temperature, or chemical composition) to cure the problem.

In a particular application for controlling the milk and wash systems such as vacuum; valve positions; wash system liquid temperature pH; chiller temperature; chemical quantity control; and bulk tank status a "closed loop control" may be utilized. Closed loop control is a process whereby the commanded operation of a mechanical system, such as chemical pump rates or wash liquid temperature, is related to a sensor monitoring the results of a commanded action so the action may be modified according to a control logic in response to the real response of the mechanical system. For example, if a closed loop control system is used to monitor and control wash liquid temperature, thermo-couples at various locations monitor system temperature and wash water at a temperature necessary to meet regulatory demands. As the system warms during the wash cycle, water temperature of successive batches or even continuous flow can be reduced because it no longer needs to warm the system. In such a system the water temperature is continuously monitored and changed to minimize energy consumption and reduce the time required to cool down the system prior to initiating another milk cycle. Other parameters such as timing of valve openings and closings, wash water pH or velocity, the flow of liquid chemicals during the wash cycle can be incorporated in a closed loop control system to make adjustments of wash parameters without intervention by an operator.

"Closed loop control" is responsive to the actual response of the thing being controlled and is particularly desirable when the parameter being controlled is a nonlinear function of the controlling action such as chemical dispensing rates or liquid temperature control. The control logic or laws can be predetermined or can be learned from the previous responses of the system. Such a learning system is known as an "adaptive control system" or "fuzzy logic system." Thus, a closed loop control system, optionally supplied with adaptive or fuzzy logic, will be most effective at achieving the desired result of controlling chemical dispensing rates or wash liquid temperatures and pH levels, for example.

Typically many factors influencing chemical dispensing can be monitored and controlled in a closed loop system including, pump rates and wear, conduit size and blockages, chemical concentration and viscosity, and water temperature. Factors affecting wash chemical temperatures include ambient temperature, mix water temperature, milk chiller temperature and operation, and other system temperature controllers. Thus, no simple relationship exists between the value being controlled and the desired result. In the past, an experienced operator would continually monitor these parameters by walking through the dairy harvesting facility. Naturally, this sort of process takes time and is subject to errors. Using a closed loop controller 56 and adaptive or fuzzy logic permits remote monitoring and control of these system parameters and results in manipulating the controlled parameters to reduce milk loss and remain within tight compliance of FDA and USDA regulations. Additional control parameters allow the data processor 14 greater capability in controlling a particular parameter. Also, the inherent physical attributes of a particular milking system play a role in the level of control achievable.

It should be understood that the particular control laws and the type of loop closure, employing fixed control logic, adaptive control logic, or fuzzy control logic are machine and system specific. However, the more parameters being controlled and the more complex the underlying physical relationship between the parameters being control and the mechanical system for controlling the parameters, the greater the need for adaptive or fuzzy control logic. As larger dairy harvesting facilities become commonplace, the need for the present invention are apparent.

It should be understood that the particular control laws and the type of loop closure, employing fixed control logic, adaptive control logic, or fuzzy control logic are machine and system specific. However, the more parameters being controlled and the more complex the underlying physical relationship between the parameters being control and the mechanical system for controlling the parameters, the greater the need for adaptive or fuzzy control logic.

It is understood that the invention is not limited to the particular construction and arrangement of parts herein illustrated and described, but embraces such modified forms thereof as come within the scope of the following claims.

What is claimed is:

1. A dairy pipeline wash system comprising:
   a first chemical supply tank, a first pump, and a first flow meter;
   a second chemical supply tank, a second pump, and a second flow meter;
   a mixer vessel in fluid communication with the first pump and, the second pump;
   a water supply in fluid communication with the mixer vessel;
   a milk harvesting pipeline system in communication with an output of the mixer for receiving chemicals seriatim from the first chemical supply tank and the second chemical supply tank; and
   a data processor for receiving input parameters from an operator interface and generating signals to activate any pump or combination of pumps to supply a predetermined amount of chemical to the mixer vessel for cleaning the milk harvesting pipeline system.

2. The dairy pipeline wash system of claim 1, and further comprising:
   a third chemical supply tank, a third pump, and a third flow meter, the third pump in fluid communication with the mixer vessel and the third chemical supply tank supplying a chemical to the milk harvesting pipeline.

3. The dairy pipeline wash system of claim 1, and further comprising:
   a data input terminal on the data processor for receiving signals from flow sensors for comparison with flow data input parameters and generating a warning signal when the flow sensor signal is out of a predetermined range.

4. The dairy pipeline wash system of claim 1, and further comprising:
   a data input terminal on the data processor for receiving signals from a bulk tank float switch; and
   a data output terminal on the data processor for transmitting signals to a diverter valve to bypass the bulk tank with wash liquid when the bulk tank float switch signals a quantity of milk in the bulk storage tank.

5. The dairy pipeline wash system of claim 1, and further comprising:
   a data input terminal on the data processor for receiving signals from a wash water pH sensor; and
   a data output terminal on the data processor for transmitting a warning signal when the signal indicates a wash water pH out of predetermined range.

6. The dairy pipeline wash system of claim 1, and further comprising:
   a data input terminal on the data processor for receiving signals from a wash water and chemical mixture velocity sensor; and
   a data output terminal on the data processor for transmitting a warning signal when the wash water and chemical mixture velocity signal is out of a predetermined range.

7. The dairy pipeline wash system of claim 1, and further comprising:
   a data input terminal on the data processor for receiving signals from a wash water and chemical mixture slug size sensor; and
   a data output terminal on the data processor for transmitting a warning signal when the wash water and chemical mixture slug size signal is out of a predetermined range.

8. A dairy pipeline wash system comprising:

a first chemical supply tank, a first pump, and a first flow meter;

a second chemical supply tank, a second pump, and a second flow meter;

a mixer vessel in fluid communication with the first pump and, the second pump;

a water supply in fluid communication with the mixer vessel;

a milk harvesting pipeline system in communication with an output of the mixer for receiving chemicals seriatim from the first chemical supply tank and the second chemical supply tank;

a data processor for receiving input parameters from an operator interface and generating signals to activate any pump or combination of pumps to supply a predetermined amount of chemical to the mixer vessel for cleaning the milk harvesting pipeline system;

a data input terminal on the data processor for receiving signals from thermo-couples in thermal communication with a plurality of locations in the dairy pipeline; and a data output terminal on the data processor for transmitting signals to a water supply source to adjust the temperature of water from the water supply source.

9. A dairy pipeline wash system comprising:

a first chemical supply tank, a first pump, and a first flow meter;

a second chemical supply tank, a second pump, and a second flow meter;

a mixer vessel in fluid communication with the first pump and, the second pump;

a water supply in fluid communication with the mixer vessel;

a milk harvesting pipeline system in communication with an output of the mixer for receiving chemicals seriatim from the first chemical supply tank and the second chemical supply tank;

a data processor for receiving input parameters from an operator interface and generating signals to activate any pump or combination of pumps to supply a predetermined amount of chemical to the mixer vessel for cleaning the milk harvesting pipeline system;

a data input terminal on the data processor for receiving signals from a pipe proximity sensor on a pipe bracket; and a data output terminal on the data processor for transmitting a warning signal when the pipe position sensor signal indicates that a pipe is out of place.

10. A dairy pipeline wash system comprising:

a dairy pipeline system for conveying milk from a milking machine to a bulk storage tank;

a plurality of pumps for conveying a mixture of cleaning chemicals and water through the dairy pipeline system;

a plurality of sensors, each sensor positioned at a predetermined location in the dairy pipeline wash system to determine actual flow rates at a respective location; and a data processor in data receiving and transmission relationships with an operator interface, the pumps, and the sensors, the data processor for receiving and storing wash cycle parameters and operation sequencing and operating times, and for receiving data monitored by the sensors for comparing actual flow rates at the respective sensor locations to predetermined flow rates to generate a warning signal when actual flow rates are out of an acceptable range relative to the predetermined flow rates.

11. The dairy pipeline wash system of claim 10, and further comprising:

a thermo-couple in thermal communication with wash water for transmitting a signal to the data processor corresponding to the temperature of the wash water; and the data processor is further programmed to compare the wash water temperature signal from the thermo-couple to a predetermined temperature range and generate a warning signal when the wash water temperature is outside of the acceptable predetermined temperature range.

12. The dairy pipeline wash system of claim 11, wherein the data processor is further programmed to activate an audible alarm in response to the warning signal when the temperature of the wash water is outside of the predetermined acceptable temperature range.

13. The dairy pipeline wash system of claim 10, and further comprising:

a plurality of thermo-couples each in thermal communication with a predetermined location in the dairy pipeline system for transmitting to the data processor a signal corresponding to the temperature at that respective pipeline location; and the data processor is further programmed to compare the signal of each thermo-couple to a predetermined acceptable temperature range and generate a warning signal if the temperature at any thermo-couple location is out of the acceptable temperature range.

14. The dairy pipeline wash system of claim 13, wherein the data processor is further programmed to activate an audible alarm in response to a warning signal when the temperature at any thermo-couple location is out of the acceptable temperature range.

15. The dairy pipeline wash system of claim 13, wherein the data processor simultaneously monitors thermo-couple sensors and data input at the operator interface for controlling the temperature of water being mixed with the wash chemicals in a closed loop relationship.

16. The dairy pipeline wash system of claim 13, wherein the data processor simultaneously monitors flow rate sensors, thermo-couple sensors, and data input at the operator interface for controlling the dispensing of chemicals and the temperature of wash water in a closed loop relationship.

17. The dairy pipeline wash system of claim 10, wherein the flow sensors each comprise:

a flow meter in fluid flow communication with each pump, the flow meter for generating a signal corresponding to the actual flow rate of fluid through the pump.

18. The dairy pipeline wash system of claim 17, wherein the data processor is further programmed to deactivate a pump in response to a warning signal when the flow through the pump is out of the acceptable flow range.

19. The dairy pipeline wash system of claim 10, wherein the data processor is further programmed to activate an audible alarm in response to the warning signal.

20. The dairy pipeline wash system of claim 10, wherein the data processor simultaneously monitors flow rate sensors and data input at the operator interface for controlling the dispensing of chemicals in a closed loop relationship.

21. The dairy pipeline wash system of claim 10, wherein the data processor simultaneously monitors flow rate sensors, thermo-couple sensors, valve position sensors, and data input at the operator interface for controlling: the dispensing of chemicals and the temperature of water being mixed with the wash chemicals and the position of valves during the wash cycle.

22. A dairy pipeline wash system of claim 10, wherein the data processor monitors milk system vacuum, and data input at the operator interface for controlling a milk system vacuum prior to initiating a wash cycle.

23. A dairy pipeline wash system comprising:
a dairy pipeline system for conveying milk from a milking machine to a bulk storage tank;
a plurality of pumps for conveying a mixture of cleaning chemicals and water through the dairy pipeline system;
a plurality of sensors, each sensor positioned at a predetermined location in the dairy pipeline wash system to determine actual flow rates at a respective location;
a data processor in data receiving and transmission relationships with an operator interface, the pumps, and the sensors, the data processor for receiving and storing wash cycle parameters and operation sequencing and operating times, and for receiving data monitored by the sensors for comparing actual flow rates at the respective sensor locations to predetermined flow rates to generate a warning signal when actual flow rates are out of an acceptable range relative to the predetermined flow rates;
a plurality of valves having a milk position for controlling the flow of milk from the milking machine to the bulk storage tank during a milking cycle and a wash position for controlling the flow of cleaning chemicals and wash water during the wash cycle;
a valve position indicator for generating a signal corresponding to the milk position and the wash position of each valve; and
the data processor is programmed to receive the signal from the valve position indicator, and generate a warning signal in the event a valve is not in the wash position prior to initiating the wash cycle.

24. The dairy pipeline wash system of claim 23, in which the data processor is further programmed to respond to a warning signal by generating a control signal to automatically reposition any valve to a wash position prior to initiating the wash cycle.

25. A dairy pipeline wash system comprising:
a dairy pipeline system for conveying milk from a milking machine to a bulk storage tank;
a plurality of pumps for conveying a mixture of cleaning chemicals and water through the dairy pipeline system;
a plurality of sensors, each sensor positioned at a predetermined location in the dairy pipeline wash system to determine actual flow rates at a respective location;
a data processor in data receiving and transmission relationships with an operator interface, the pumps, and the sensors, the data processor for receiving and storing wash cycle parameters and operation sequencing and operating times, and for receiving data monitored by the sensors for comparing actual flow rates at the respective sensor locations to predetermined flow rates to generate a warning signal when actual flow rates are out of an acceptable range relative to the predetermined flow rates;
wherein the data processor is further programmed to activate a first pump to circulate wash water and cleaning chemicals through a dairy pipeline system;
activate an air injector to enhance water velocity through the dairy pipeline system;
drain the wash water from the dairy pipeline system;
activate a second pump to circulate the wash water and a second cleaning chemical through the dairy pipeline system;
activate an air injector to enhance water and second cleaning chemical velocity through the dairy pipeline system; and
drain the wash water and second cleaning chemical from the dairy pipeline system.

26. The dairy pipeline wash system of claim 25, wherein the data processor is further programmed to:
fill the wash vessel with water;
activate a third pump to circulate a chemical detergent and water through the dairy pipeline system;
activate an air injector to enhance water and the chemical detergent velocity through the dairy pipeline system; and
drain the chemical detergent and water from the dairy pipeline system.

27. A dairy pipeline wash system comprising:
a dairy pipeline system for conveying milk from a milking machine to a bulk storage tank;
a plurality of pumps for conveying a mixture of cleaning chemicals and water through the dairy pipeline system;
a plurality of sensors, each sensor positioned at a predetermined location in the dairy pipeline wash system to determine actual flow rates at a respective location;
a data processor in data receiving and transmission relationships with an operator interface, the pumps, and the sensors, the data processor for receiving and storing wash cycle parameters and operation sequencing and operating times, and for receiving data monitored by the sensors for comparing actual flow rates at the respective sensor locations to predetermined flow rates to generate a warning signal when actual flow rates are out of an acceptable range relative to the predetermined flow rates, wherein the data processor simultaneously monitors flow rate sensors, thermo-couple sensors, chiller temperatures, and data input at the operator interface for controlling the dispensing of chemicals and the temperature of water being mixed with the wash chemicals in a closed loop relationship.

28. A dairy pipeline wash system, comprising:
an operator interface for inputting dairy pipeline wash parameters relating to the cleaning of a dairy pipeline between a milking machine and a milk storage tank;
a plurality of sensors for monitoring dairy pipeline wash conditions and generating data corresponding to the monitored wash conditions;
a data processor in data receiving relationship with the operator input to store the dairy pipeline wash parameters and in a data receiving relationship with the sensors for receiving wash condition data, the data processor being programmed to compare the wash parameters with the wash conditions and generate a warning signal when monitored wash conditions are outside of the stored wash parameters.

29. The dairy pipeline wash system of claim 28, wherein the sensors are wash chemical flow meters.

30. The dairy pipeline wash system of claim 28, wherein the sensors are wash water monitoring thermo-couples.

31. The dairy pipeline wash system of claim 28, wherein the sensors are valve position indicators for monitoring valve positions prior to initiating a wash cycle.

32. The dairy pipeline wash system of claim 28, wherein the sensors are wash water pH sensors for monitoring wash water pH prior to mixing with cleaning chemicals.

33. The dairy pipeline wash system of claim 28, wherein the sensors are wash liquid velocity sensors for monitoring the velocity of wash liquid in the dairy pipeline.

34. The dairy pipeline wash system of claim 28, wherein the sensors are pipe proximity indicators for monitoring wash system pipe connections to be dairy pipeline.

* * * * *